Feb. 28, 1961 J. H. STRASSBURGER Re. 24,944
APPARATUS FOR OPERATING METALLURGICAL FURNACES
Original Filed Oct. 3, 1952
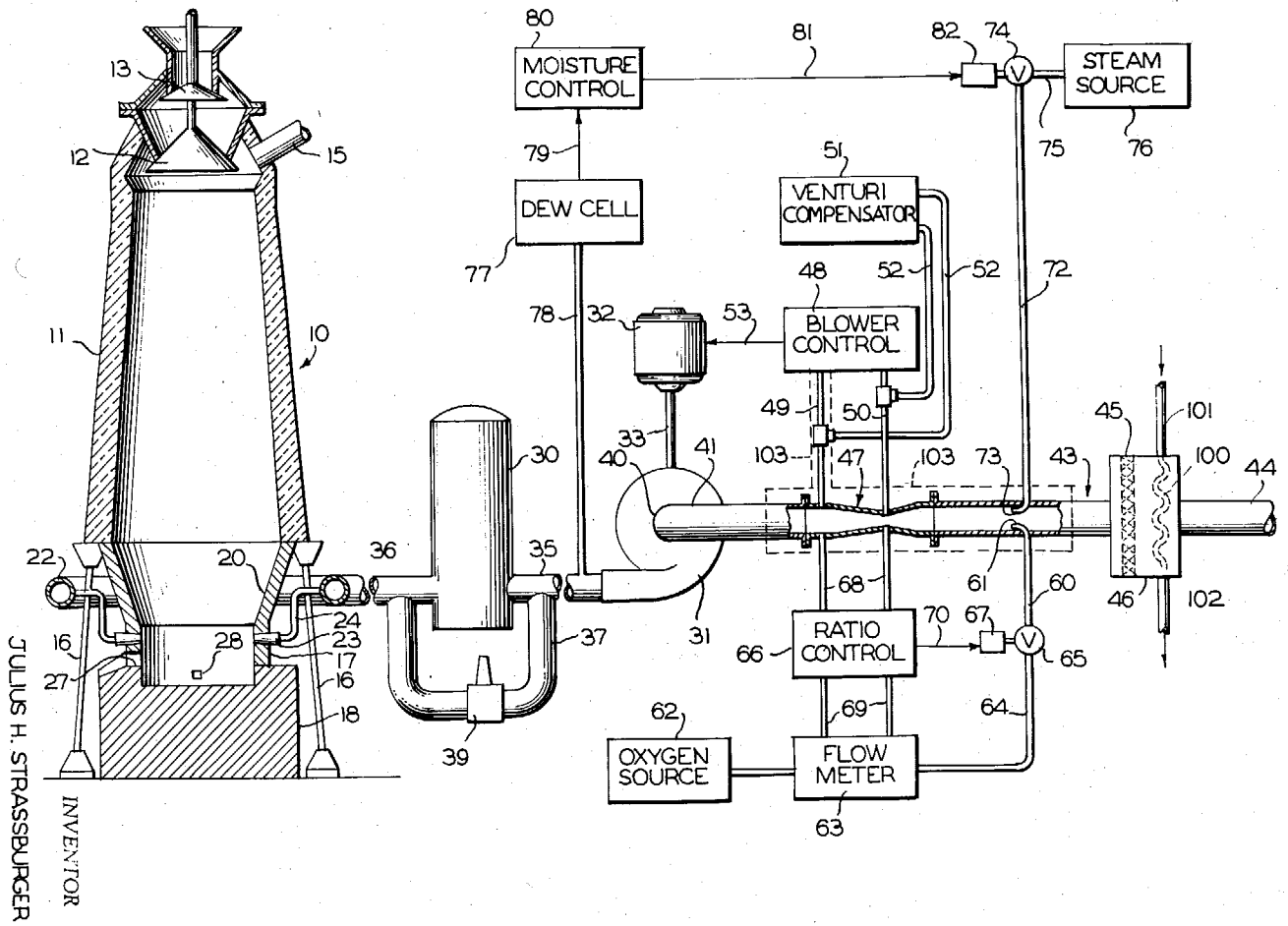
INVENTOR
JULIUS H. STRASSBURGER
BY
ATTORNEY United States Patent Office Re. 24,944
Reissued Feb. 28, 1961

24,944

APPARATUS FOR OPERATING METALLURGICAL FURNACES

Julius H. Strassburger, Coraopolis, Pa., assignor to National Steel Corporation, a corporation of Delaware Original No. 2,778,018, dated Jan. 15, 1957, Ser. No. 312,877, Oct. 3, 1952. Application for reissue May 2, 1958, Ser. No. 735,083

25 Claims. (Cl. 266—30)

Matter enclosed in heavy brackets [ ] appears in the original patent but forms no part of this reissue specification; matter printed in italics indicates the additions made by reissue.

This invention relates to blast furnace installations and their operation and more particularly to improvements in blast furnaces and to improvements in the method of operating blast furnaces when an oxygen rich blast is used to burn the carbonaceous material and smelt the iron ore to produce molten pig iron.

Conventional blast furnaces comprise a lower hearth, a stack and a bosh between the hearth and the stack. A blast, comprising essentially compressed air, is blown through tuyeres mounted below the bosh into the upper portion of the hearth, and the burden, including limestone, ferrous bearing material and carbonaceous material, is charged into the furnace at the top of the stack. The ferrous bearing material is usually iron ore and may include some scrap metal, sinter or other material, and the carbonaceous material is usually coke. The charge moves down the shaft of the furnace, and when it reaches a zone adjacent the tuyeres, the coke is burned by the incoming blast to smelt the iron ore and produce molten pig iron. The hot gaseous products of combustion flow up through the stack and out the top of the furnace. As the hot gases flow up the stack, they preheat the descending charge and reduce the iron ore as it approaches the combustion zone. The molten pig iron collects in the bottom of the furnace beneath a layer of molten slag. Blast furnace installations also include a number of stoves for preheating the blast to an elevated temperature. The stoves are usually employed in groups and while some of the stoves are being heated, by burning top gas from the top of the blast furnace for example, at least part of the air blast is warmed upon flowing through the remaining stoves which have been previously heated. In many cases part of the blast is by-passed around the heated stoves and is then mixed with the hot blast from the stoves before the blast is discharged through the tuyeres into the furnace. By varying the quantity of cold blast, it is possible to compensate for variations in stove temperature and maintain the hot blast discharged into the furnace at a substantially constant temperature which may, for example, be at 1000° F. Turboblowers are usually employed for compressing the air and for blowing the blast through the stoves into the furnace. The blowers may be controlled by manually operable or automatically operable means to maintain the amount of blast blown into the furnace substantially constant. The volume of air blown into the furnace will vary depending upon the size of the furnace and the charge and upon the character of the ferrous bearing material. For example, a blast furnace intended to produce about 1000 tons of pig iron per day will require an air blast at the rate of about 75,000 cubic feet per minute. It is to be noted that the air constitutes the largest mass of material introduced into the blast furnace.

In blast furnace operation the quantity of material discharged into the top of the furnace and the rate and mass of blast blown into the furnace are calculated and controlled, taking into consideration, of course, the character of the ferrous bearing material, to maintain the highest possible rate of pig iron production of desired characteristics without exceeding a maximum permissible loss due to flue dust production. The amount of blast necessary for a given set of conditions is very critical and must be carefully calculated and continuously maintained for a smooth operating blast furnace. It is also well known that if the blast is insufficient a low rate of pig iron production will be obtained, while if the blast is excessive the rate of flue dust production will rapidly increase as a result of the increase in the amount of gases flowing upwardly through the furnace, and will nullify any increase in scrap-free pig iron production.

Inasmuch as it is the oxygen in the blast which burns the coke to smelt the iron, there has been considerable discussion of the advantages and disadvantages of enriching the blast with oxygen as a means to increase pig iron production without a corresponding increase in flue dust. Many of the articles and patent teachings are contradictory, and this contradiction may result from the fact that substantially all of the discussion is based on theory and not on practice. In addition, and despite the long use of blast furnaces, those skilled in the art do not know for certain what takes place in the blast furnaces. The expected increase in production with an oxygen enriched blast is based upon the increased rate of combustion which would in turn develop a higher temperature in the hearth. However, this performance increases the rate of downward movement of the burden in the shaft and the furnace will run "cold," that is, the descending burden is insufficiently heated in the stack. In order to overcome this condition and transfer heat from the hearth up into the stack, it has been suggested that water be added to the blast as the water would enter into an exothermic reaction with the carbon in the region of the hearth and produce hydrogen and carbon monoxide. Thus, the use of oxygen and water would appear to nullify each other, as oxygen is used to increase the rate of combustion and the hearth temperature, and water would in turn decrease the rate of hearth combustion and temperature.

I have found in practice, however, that the addition of oxygen to the air blast does increase production but tends to increase the variation in furnace operation. The addition of oxygen to the blast also causes the furnace to tend to run cold. I also have found that a smoothly operating furnace providing an increase in production of scrap-free pig iron can be obtained while at the same time actually decreasing the production of flue dust by the controlled additions of predetermined amounts of moisture to the blast in specific relation with the percentage of oxygen enrichment.

In actual operation of blast furnaces it is not uncommon to experience erratic operation even in the absence of substantial changes in the burden constituents or in the relationship between the burden and the blast. In such cases difficulty has been encountered when attempting to smooth out the operation of the furnace since a change in the burden is not immediately effective as it requires a number of hours for the burden to reach the hearth. Also, while the amount of hot blast blown into the furnace can be changed, only minor adjustments can be made in this manner due to effect of the blast on pig iron and flue dust production. I have found that such erratic operations may be relatively quickly overcome without material reduction of scrap-free pig iron production by controlling the percentage of oxygen enrichment and mositure content of the blast gas and their relationship with each other.

It is an object of the invention to provide [an] improved [method of and ] apparatus for using an oxygen enriched air blast in a blast furnace.

Another object is to provide [an] improved [method of and] apparatus for using an oxygen enriched air blast in a blast furnace and thereby effect an increase in production and satisfactory reduction of the iron ore in the stack without increasing the rate of flue dust production.

Another object is to provide [an] improved [method of and] apparatus for using an oxygen enriched air blast in a blast furnace and thereby effect an increase in production and satisfactory reduction of the iron ore in the stack without increasing the rate of flue dust production.

Another object is to provide [an] improved [method of and] apparatus for using an oxygen enriched blast in a blast furnace and to add moisture to the oxygen enriched air blast in such a manner as to not lose the advantages obtained from the use of oxygen and without causing the furnace to perform erratically.

Still another object is to provide an improved blast furnace installation constructed and arranged to utilize an oxygen enriched air blast in such a manner as to improve the heat balance between the charge in the stack and the combustion zone while obtaining an increase in the rate of production of pig iron without increasing the production of flue dust.

A still further object of the present invention is to provide an improved blast furnace installation constructed and arranged to enrich the blast with oxygen and moisture in such a manner as to promote an increase in production of useable pig iron without causing the furnace to perform erratically and without increasing the production of flue dust.

Other objects and features of the present invention will appear more fully from the following detailed description considered in connection with the accompanying drawing which discloses a single embodiment of the invention. It is expressly understood however that the drawing is designed for purpose of illustration only and not as a definition of the limits of the invention, reference for the latter purpose being had to the appended claims.

The single figure of the drawing is a diagrammatic view illustrating a blast furnace installation embodying the principles of the present invention.

With reference more particularly to the drawing, a blast furnace installation constructed in accordance with the principles of the present invention is disclosed therein including a blast furnace 10 having a vertical, substantially cylindrical stack 11 provided with a large bell 12 and a small bell 13 for facilitating the charging of the solid burden in the top of the furnace. There is also at the top of the stack 11, one and usually more off-take pipes 15 for conducting the top gas from the top of the furnace. The stack is supported at its lower end by a plurality of pillars 16 arranged around the lower periphery of the furnace. At the lower end of the furnace, there is a furnace hearth 17 supported by a base 18. Between the hearth 17 and the stack 11, there is a bosh 20. A bustle pipe 22 encircles the lower portion of the furnace for supplying blast gas under pressure to the hearth. A plurality of tuyeres 23 extend around the upper portion of the hearth and project through the wall defining the hearth. Each tuyere 23 is connected by a blowpipe 24 to the bustle pipe 22 so that the compressed blast gas in the bustle pipe flows through the blowpipes 24 and then through the tuyeres and into the furnace hearth. The molten slag and iron collect in the hearth and an upper tap hole 27 is provided for periodically tapping molten slag from the furnace. An iron notch 28 is provided in the hearth at a level below the tapping hole 27 for periodically tapping molten pig iron from the furnace.

The blast gas supplied to bustle pipe 22 customarily is an air blast which has been preheated. Usually, at least three stoves 30 are provided for each blast furnace and are used separately for preheating the blast. For example, while a hot stove is being used to preheat cold blast gas, the other stoves are being heated, usually by burning top gas withdrawn from the top of the blast furnace 10. This is a customary construction, and only one stove 30 is shown in the drawing.

Large capacity compressor means, such as a blower 31, is provided for compressing the blast for the furnace. The blower 31 may be driven by a steam turbine or by an electric motor 32 connected to the blower through a shaft 33. The blast gas discharged from the blower 31 is conducted to the stove by a large pipe or conduit 35, and the stove is in turn connected to the bustle pipe 22 by a large pipe 36 which conducts the preheated blast in the stove 30 to the bustle pipe 22. A by-pass pipe 37 including a valve 39 is connected to the pipe 35 and the pipe 37. During operation, the temperature in the stove varies and a major portion of the blast flows through the stove 30 and is preheated therein. A minor portion of the blast flows through the pipe 37, and this cold blast is discharged into pipe 36 where it mixes with the hot or preheated blast from the stove 30. Thus by varying the setting of the valve 39, the proportions of cold and hot blast can be varied to maintain the temperature of the preheated blast supplied to bustle pipe 22 at a substantially constant value. The intake side 40 of blower 31 is connected to one end 41 of a large pipe 43, the other end 44 of the pipe 43 communicates with a source of blast gas, such as the atmosphere. A filter 45 mounted in a casing 46 is deposed in the conduit 43 adjacent the end 44 so that the incoming gas, usually atmospheric air, is filtered to remove dirt and dust therefrom.

Apparatus for maintaining at a predetermined value the quantity of blast gas blown into the furnace includes a venturi type measuring device 47 mounted in the conduit 43 and a blower control 48 connected to the venturi measuring device through loading lines 49 and 50. The venturi measuring device is of conventional construction and includes a compensator 51 connected to the loading lines 49 and 50 by conduits 52. The compensator functions to indicate in what manner the venturi indications must be changed to compensate for deviations in barometric pressure and temperature relative to the designed constants. The blower control 48 is also of conventional construction and is preferably of the type including a calibrated manually operable element for determining the desired blower output in terms of cubic feet of blast gas per minute, for example. Setting of the manually operable element establishes a proportional force which is applied against a force derived from the measuring device 47 proportional to the rate of flow of the blast gas through the conduit 43. Unbalancing of these forces produces a control signal of the proper characteristic which is transmitted to the motor 32 through lead 53 to increase or decrease the output of the blower and maintain the rate of flow through the conduit 43 equal to the desired rate of flow as determined by the calibrated manually operable element of the blower control 48. In this type of control the loading lines 49 and 50 are usually connected to closed chambers having a common diaphragm wall which moves in opposition to the force established by the manually operable element. With this arrangement a predetermined quantity of blast gas may be constantly maintained automatically with only slight adjustments necessary to compensate for variations in temperature and barometric pressure. Also, the operator may easily determine the quantity of the blast from a suitable gauge indicating directly the rate of flow of blast gas as determined on the device 47 and may readily change the rate of flow as required by merely adjusting the calibrated manually operable member of the blower control 48.

According to the present invention the blast blown into the furnace 10 comprises a composite stream formed by combining the stream of atmospheric air flowing through the conduit 43 with separate streams of oxygen or oxygen rich gas and water vapor such as steam. The oxygen enriching stream is controlled relative to the composite stream so that the composite stream comprising the blast gas blown to the furnace includes a predetermined proportion of oxygen which may be varied through fixed limits, while the water vapor stream is adjusted to establish a constant moisture content in the composite stream, which can be varied, irrespective of the degree of natural moisture in the atmospheric air. The composite stream is formed so that a constant mass of blast gas may be continually blown into the furnace irrespective of changes in the natural moisture content of the atmospheric air, or changes in the moisture content and percentage of oxygen enrichment in the blast gas.

A stream of oxygen or oxygen rich gas is added to the air stream flowing through the conduit 43 by means of a conduit 60 having its discharge end 61 terminated within the conduit 43 on the up-stream of the venturi measuring device 47. The oxygen is derived from any suitable source 62 which may comprise an air fractionating apparatus capable of producing a large quantity of relatively impure oxygen. The oxygen stream from the source 62 is passed through a flow meter 63, a conduit 64 and a control valve 65 before entering the conduit 60. The oxygen stream is of substantially uniform purity and is maintained at substantially constant pressure and temperature so that the amount of oxygen added to the air stream in the conduit 43 and hence the percentage of oxygen enrichment in the composite stream will depend in the most part upon the position of the oxygen control valve 65. A system is provided for controlling the valve 65 to establish and maintain constant predetermined percentages of oxygen enrichment of the composite stream. For this purpose a ratio control 66 is provided which operates responsively to the rate of flow of the composite stream and to the rate of flow of the oxygen stream as determined by the venturi measuring device 47 and the flow meter 63, respectively, to produce a proportional control signal which determines the positioning of the oxygen valve 65 through operation of a suitable transmitter 67. The ratio control 66 may be of any suitable conventional construction and may be similar to the blower control 48 described above in which case a differential pressure actuated diaphragm controlled by the oxygen flow meter would replace the manually operable element and the desired proportioning would be obtained by adjustable spring biasing means in a conventional manner. Specifically, the loading lines 68 from the venturi measuring device 47 and the loading lines 69 from the flow meter 63 may each communicate with individual chambers spaced by common diaphragms moving in opposition and being adjustably biased to maintain the desired percentage relationship between the oxygen flow and the rate of flow of the composite stream. The resultant movement of the diaphragms may be transmitted by means of a mechanical, hydraulic or electric medium 70 to the transmitter 67 for controlling the valve 65. With this arrangement the oxygen streams entering the conduit 43 may be accurately controlled so that the composite stream passing through the venturi measuring device 47 includes a fixed percentage of oxygen as determined by the desired setting of the ratio control 66.

The water vapor stream, shown as a stream of steam, is conducted to the conduit 43 by way of a conduit 72 having an end 73 terminated within the conduit 43 upstream of the measuring device 47. The other end of the conduit 72 is connected to a control valve 74 joined by way of a conduit 75 to a source of moisture such as a steam source 76. In order to control the vapor stream so that the composite stream at all times includes a predetermined quantity of moisture, the moisture content of the composite stream is sampled, compared to a desired standard which may be adjustably varied and the control valve 74 then automatically adjusted responsively to the comparative result to increase or decrease the quantity of steam introduced into the conduit 43. For this purpose, a dew cell 77 is connected through a conduit 78 to the discharge side of the blower 31 or to any point in the system for sampling the composite stream and determining its moisture content. The dew cell 77 is of conventional construction and is well known to the art comprising a humidity sensitive cell that may be adjusted to produce an output signal proportional to the absolute humidity of the composite stream. This output signal is fed through connector 79 to a moisture control 80. The moisture control 80 is also of conventional construction and may be similar to the blower control 48 described above. With this type of control the signal supplied by the dew cell 77, which is proportional to the moisture content in the composite stream, is balanced against a force proportional to a predetermined or desired moisture content value established by the position of a calibrated manually operable element. An error signal is generated responsively to any difference between these forces and the error signal is transmitted by way of an electrical, hydraulic or mechanical medium 81 to a suitable transmitter 82 operatively connected to the valve 74. With this type of arrangement should a natural moisture in the atmosphere produce, for example, four grains of moisture per cubic foot of the composite stream, and should it be desired to establish and maintain a moisture content of eight grains per cubic foot of the composite stream, the moisture control 80 would be adjusted by proper setting of its manually operable element to the desired moisture content. Thereupon the valve 72 would be automatically adjusted to continuously provide a stream of steam of the proper quantity to add a moisture content of four grains per cubic foot to the composite stream so that the total moisture content of the composite stream would equal eight grains per cubic foot which corresponds to the desired value. Should the natural moisture content of the air change under these circumstances the valve 74 is automatically moved to a new position to maintain a supply of vapor to the composite stream equal to the difference between the desired moisture content and the natural moisture in the atmospheric air. Of course should the natural moisture content of the air exceed the desired value it may be necessary to add dry air to the composite stream. However, this condition is not likely to occur under circumstances that cannot be corrected by adjusting the relationship between the percentage of oxygen enrichment and moisture content.

A heating element 100 is positioned in the casing 46 for preheating the atmospheric air stream entering the conduit 43 when the temperature of the air falls below approximately 60° F. The heat may be supplied from any suitable medium such as steam and the heating element 100 includes a steam inlet conduit 101 and a steam outlet conduit 102. Also, heating jackets 103 may surround the venturi measuring device 47 and the loading lines therefrom. The heating jackets 103 may be provided with inlet and outlet conduits not shown, for a heat transmitting medium such as steam. Preheating the air prevents occurrence of certain adverse conditions which would take place when operating the system during periods of low temperature. For example, the provision of the heater 100 prevents the condensation of water vapor from the incoming air and thus deters collection of moisture in the loading lines leading from the venturi measuring device 47, the collection of condensed moisture in the blower inlet and the collection of frost in the suction pipe and in the venturi measuring device. The occurrence of these conditions would affect the venturi measurements and upset the blower and the oxygen enrichment settings and may cause mechanical damage to the blower. The provision of the heating jackets around the venturi measuring device and the loading lines function to prevent formations of frost on their internal surfaces during severely cold atmospheric weather conditions. It is understood that air preheating alone may ordinarily be sufficient to prevent these adverse conditions.

As set forth in copending application Serial No. 312,878, filed October 3, 1952, now Patent No. 2,735,758, for Method of Operating Metallurgical Furnace it is necessary in order to obtain full advantage from an oxygen enriched blast to add moisture to the blast in fixed relationship with the percent of oxygen enrichment, taking into consideration the character of the burden and the silicon content of the pig iron desired. When it is designed, for example, to provide a blast for the blast furnace 10 of 75,000 cubic feet per minute the calibrated manually operative element of the blower control 48 is adjusted so that the blower 31 produces the desired output. The blower 31 will maintain this output substantially constant through control of the venturi measuring device 47 coupled to the blower control 48. The only material variations in the blower output will occur upon changes in barometric pressure and changes in temperature of the atmospheric air. The necessary control of the blower output to overcome these variations are provided by the compensator 51.

Should the characteristics of the blast furnace and the burden dictate the use of a blast having 2% oxygen enrichment and moisture content of 8 grains per cubic foot the ratio control 66 would be adjusted to maintain the desired oxygen percentage while the moisture control 80 would be set to give the desired moisture content. In the case of the oxygen, the ratio control 66 would function to compare the rate of flow of the composite stream through the venturi measuring device 47 and the rate of flow of the oxygen stream through the flow meter 63 and properly positioned the oxygen valve 65 to establish the relative rates of flow so that the composite stream entering the inlet 41 of the blower 31 would consist of 2% oxygen. The moisture control 80 functions to set the valve 74 so that the stream of steam entering the conduit 43 by way of the conduit 72 will continuously supply the number of grains of moisture per cubic foot equal to the difference between the natural moisture in the air and the desired moisture content as determined by the setting of the moisture control 80. Any changes in the natural moisture content of the atmospheric air therefore will have no effect upon the moisture content of the blast entering the blast furnace.

The present invention thus provides [a] novel [method of and] apparatus for maintaining a blast of constant mass, in which the blast comprises a composite stream including air, oxygen and moisture in fixed, predetermined percentages. The mass of the blast is maintained constant throughout a wide range of oxygen enrichment percentages and relative moisture content values and independent of variations in the natural moisture content of the air and in the barometic pressure and the temperature of the air. This is accomplished by forming a composite stream of the desired components and by blowing this composite stream to the furnace at a constant, predetermined rate, and by providing an arrangement for accurately establishing and continuously maintaining the percentages of oxygen enrichment and relative values of water moisture additions.

Although only one embodiment of the invention has been disclosed and described herein, it is expressly understood that various changes and substitutions may be made without departing from the spirit of the invention as well understood by those skilled in the art. Reference therefore will be had to the appended claims for a definition of the limits of the invention.

What is claimed is:

1. In a blast furnace installation including a blast furnace having tuyere means through which compressed blast gas is discharged into the furnace, compressor means for compressing blast gas and blowing compressed blast gas to the tuyere means, a first conduit means for conducting blast gas to the compressor means, the blast gas including atmospheric air containing a varying amount of water vapor, measuring means in the first conduit means for measuring the rate of flow of the blast gas, control means operative responsively to the measuring means for controlling the compressor means, a second conduit means for introducing oxygen to the blast gas, a third conduit means connected to the first conduit means up-stream of the measuring means for introducing water vapor into the blast gas, and means for controlling the flow of water vapor through the third conduit means to maintain a constant quantity of water vapor in the blast gas.

2. In a blast furnace installation including a blast furnace having tuyere means through which compressed blast gas is discharged into the furnace, means forming a composite stream including atmospheric air, oxygen and moisture, a compressor means for compressing the composite stream, a first conduit means for conducting the composite stream to the compressor means, second conduit means for conducting the compressed composite stream to the furnace as blast gas, measuring means in the first conduit means for measuring the rate of flow of the composite stream to the furnace and control means operative responsively to the measuring means for controlling the compressor means.

[3. In a blast furnace installation including a blast furnace having tuyere means through which compressed blast gas is discharged into a furnace, means forming streams of atmospheric air, oxygen rich gas and water vapor, means combining the streams to form a composite stream, a compressor means for compressing the composite stream, a first conduit means for conducting the composite stream to the compressor means, a second conduit means for conducting the compressed composite stream to the tuyere means as blast gas for the furnace, measuring means in the first conduit means for measuring the rate of flow of the composite stream to the furnace, and control means operative responsively to the measuring means for controlling the compressor means.]

4. In a blast furnace installation according to claim [3]2 comprising means for measuring the rate of flow of the stream of oxygen rich gas and means for comparing the rate of flow of the stream of oxygen rich gas and the rate of flow of the composite stream to determine the percentage of oxygen in the composite stream.

5. In a blast furnace installation according to claim [3]2 comprising moisture measuring means for measuring the moisture content of the composite stream on its way to the furnace, and moisture control means operative responsively to the moisture measuring means for controlling the rate of the stream of water vapor.

6. In a blast furnace installation according to claim [3]2 comprising means for measuring the moisture content of the composite stream on its way to the furnace, moisture control means including comparing means for comparing the moisture content of the composite stream and a predetermined moisture content, and means for controlling the rate of flow of the stream of water vapor responsively to the comparing means to thereby maintain a moisture content in the composite stream substantially corresponding to the predetermined moisture content irrespective of the natural moisture content of the stream of atmospheric air.

7. In a blast furnace installation including a blast furnace having tuyere means through which compressed blast gas is discharged into a furnace, means forming streams of atmospheric air, oxygen rich gas and water vapor, means combining the streams to form a composite stream, a compressor means for compressing the composite stream, a first conduit means for conducting the composite stream to the compressor means, a second conduit means for conducting the compressed composite stream to the tuyere means as blast gas for the furnace, measuring means in the first conduit means for measuring the rate of flow of the composite stream to the furnace, control means operative responsively to the measuring means for controlling the compressor means, means for measuring the rate of flow of the stream of oxygen rich gas, means for comparing the rate of flow of the stream of oxygen rich gas and the rate of flow of the composite stream to determine the percentage of oxygen in the composite stream, moisture measuring means for measuring the moisture content of the composite stream on its way to the furnace, and moisture control means operative responsively to the moisture measuring means for controlling the rate of flow of the stream of water vapor.

8. In a blast furnace installation including a blast furnace having tuyere means through which compressed blast gas is discharged into a furnace, means forming streams of atmospheric air, oxygen rich gas and water vapor, means combining the streams to form a composite stream, a compressor means for compressing the composite stream, a first conduit means for conducting the composite stream to the compressor means, a second conduit means for conducting the compressed composite stream to the tuyere means as blast gas for the furnace, measuring means in the first conduit means for measuring the rate of flow of the composite stream to the furnace, control means operative responsively to the measuring means for controlling the compressor means, means for measuring the rate of flow of the stream of oxygen rich gas, means for comparing the rate of flow of the stream of oxygen rich gas and the rate of flow of the composite stream to determine the percentage of oxygen in the composite stream, means for measuring the moisture content of the composite stream on its way to the furnace, moisture control means including comparing means for comparing the moisture content of the composite stream and a predetermined moisture content, and means for controlling the rate of flow of the stream of water vapor responsively to the comparing means to thereby maintain a constant predetermined moisture content in the composite stream irrespective of the natural moisture content of the stream of atmospheric air.

9. In a blast furnace installation as set forth in claim 8 in which heating means is provided for preheating the stream of atmospheric air before the atmospheric air stream is combined with the streams of oxygen rich gas and water vapor to form the composite stream.

10. In a blast furnace installation as set forth in claim 9 in which the measuring means for measuring the rate of flow of the composite stream comprises a venturi measuring device including heating means for preventing frost formations on the interior surfaces of the venturi and in the loading lines thereof.

11. In a blast furnace installation including a blast furnace having tuyere means through which compressed blast gas is discharged into a furnace, means forming streams of atmospheric air, oxygen rich gas and water vapor, means for heating the stream of atmospheric air, means combining the heated stream of atmospheric air and the streams of oxygen rich gas and water vapor to form a composite stream, a compressor means for compressing the composite stream, a first conduit means for conducting the composite stream to the compressor means, a second conduit means for conducting the compressed composite stream to the tuyere means as blast gas for the furnace, measuring means in the first conduit means for measuring the rate of flow of the composite stream to the furnace, and control means operative responsively to the measuring means for controlling the compressor means.

12. In a blast furnace installation as set forth in claim 11 in which the measuring means comprises a venturi type measuring device provided with heating means to prevent frost formation in the venturi passageways and the loading lines thereof.

13. In a blast furnace installation including a blast furnace having tuyere means through which compressed blast gas is discharged into a furnace, means forming streams of atmospheric air, oxygen rich gas and water vapor, means combining the streams to form a composite stream, a compressor means for compressing the composite stream, a first conduit means for conducting the composite stream to the compressor means, a second conduit means for conducting the compressed composite stream to the tuyere means as blast gas for the furnace, measuring means for measuring the rate of flow of the composite stream to the furnace, means for measuring the rate of flow of the stream of oxygen rich gas, means for comparing the rate of flow of the stream of oxygen rich gas and the rate of flow of the composite stream to determine the percentage of oxygen in the composite stream, and means for maintaining at a predetermined value the quantity of blast gas passed through the tuyere means and discharged into the furnace.

14. In a blast furnace installation including a blast furnace having tuyere means through which compressed blast gas is discharged into a furnace, means forming streams of atmospheric air, oxygen rich gas and water vapor, means combining the streams to form a composite stream, a compressor means for compressing the composite stream, a first conduit means for conducting the composite stream to the compressor means, a second conduit means for conducting the compressed composite stream to the tuyere means as blast gas for the furnace, measuring means for measuring the rate of flow of the composite stream to the furnace, means for measuring the rate of flow of the stream of oxygen rich gas, means for comparing the rate of flow of the stream of oxygen rich gas and the rate of flow of the composite stream to determine the percentage of oxygen in the composite stream, moisture measuring means for measuring the moisture content of the composite stream on its way to the furnace, moisture control means operative responsively to the moisture measuring means for controlling the rate of flow of the stream of water vapor, and means for maintaining at a predetermined value the quantity of blast gas passed through the tuyere means and discharged into the furnace.

*15. In a blast furnace installation including a blast furnace having tuyere means through which blast gas is discharged into the furnace, means forming streams of atmospheric air, oxygen rich gas and water vapor, means combining the streams to form a composite stream, means including compressor means for blowing the composite stream at a predetermined rate of flow to the tuyere means as blast gas, control means for maintaining the stream of oxygen rich gas at a predetermined rate of flow to maintain a controlled percentage of oxygen enrichment in the blast gas, and means for controlling the rate of flow of the stream of water vapor to maintain in the blast gas a substantially constant percentage of water vapor having a definite relation with the percentage of oxygen enrichment irrespective of the natural moisture content of the stream of atmospheric air.*

*16. In a blast furnace installation including a blast furnace having tuyere means through which blast gas is discharged into the furnace, means forming streams of atmospheric air, oxygen rich gas and water vapor, means combining the streams to form a composite stream, conduit means for conducting the composite stream to the tuyere means, means including compressor means for blowing the composite stream through the conduit means to the tuyere means as blast gas for the furnace, moisture measuring means for measuring the moisture content of the composite stream, and moisture control means operative responsively to the moisture measuring means*

*for controlling the rate of flow of the stream of water vapor.*

*17. In a blast furnace installation including a blast furnace having tuyere means through which blast gas is discharged into the furnace, means forming streams of atmospheric air, oxygen rich gas and water vapor, means combining the streams to form a composite stream, conduit means for conducting the composite stream to the tuyere means, means including compressor means for blowing the composite stream through the conduit means to the tuyere means as blast gas for the furnace, control means for maintaining the stream of oxygen rich gas at a predetermined rate of flow to establish a controlled percentage of oxygen enrichment in the blast gas, moisture measuring means for measuring the moisture content of the composite stream, and moisture control means operative responsively to the moisture measuring means for controlling the rate of flow of the stream of water vapor.*

*18. In a blast furnace installation including a blast furnace having tuyere means through which blast gas is discharged into the furnace, means forming streams of atmospheric air, oxygen rich gas and water vapor, means combining the streams to form a composite stream, conduit means for conducting the composite stream to the tuyere means, means including compressor means for blowing the composite stream through the conduit means to the tuyere means as blast gas for the furnace, control means including a venturi for maintaining the stream of oxygen rich gas at a predetermined rate of flow to establish a controlled percentage of oxygen enrichment in the blast gas, moisture measuring means for measuring the moisture content of the composite stream, and moisture control means operative responsively to the moisture measuring means for controlling the rate of flow of the stream of water vapor.*

*19. In a blast furnace installation including a blast furnace having tuyere means through which blast gas is discharged into the furnace, means forming streams of atmospheric air, oxygen rich gas and water vapor, means combining the streams to form a composite stream, conduit means for conducting the composite stream to the tuyere means, means including compressor means for blowing the composite stream through the conduit means to the tuyere means as blast gas for the furnace, moisture measuring means for measuring the moisture content of the composite stream, moisture control means including comparing means for comparing the moisture content of the composite stream and a predetermined moisture content, and means for controlling the rate of flow of the stream of water vapor responsively to the comparing means to maintain a moisture content of the composite stream substantially corresponding to the predetermined moisture content irrespective of the natural moisture content of the stream of atmospheric air.*

*20. In a blast furnace installation including a blast furnace having tuyere means through which blast gas is discharged into the furnace, means forming streams of atmospheric air, oxygen rich gas and water vapor, means combining the streams to form a composite stream, conduit means for conducting the composite stream to the tuyere means, means including compressor means for blowing the composite stream through the conduit means to the tuyere means as blast gas for the furnace, stove means connected to the conduit means, moisture measuring means for measuring the moisture content of the composite stream upstream of the stove means, and moisture control means operative responsively to the moisture measuring means for controlling the rate of flow of the stream of water vapor.*

*21. In a blast furnace installation including a blast furnace having tuyere means through which blast gas is discharged into the furnace, means forming streams of atmospheric air, oxygen rich gas and water vapor, means combining the streams to form a composite stream, compressor means, conduit means connected to the compressor means for conducting composite stream to the compressor means and for conducting composite stream from the compressor means to the tuyere means as blast gas for the furnace, measuring means in the conduit means for measuring the rate of flow of composite stream through the compressor means, and control means operative responsively to the measuring means for controlling the compressor means.*

*22. In a blast furnace installation including a blast furnace having tuyere means through which blast gas is discharged into the furnace, means including compressor means for blowing blast gas to the tuyere means, the blast gas including atmospheric air containing water vapor, measuring means for measuring the rate of flow of blast gas through the compressor means, control means operative responsively to the measuring means for controlling the compressor means, means including first conduit means for introducing oxygen to the blast gas, means including second conduit means for introducing water vapor into the blast gas, and means including means for controlling the flow of water vapor in the second conduit means to maintain a substantially constant quantity of water vapor in the blast gas blown to the tuyere means irrespective of the amount of water vapor in the atmospheric air.*

*23. In a blast furnace installation including a blast furnace having tuyere means through which blast gas is discharged into the furnace, means including compressor means for blowing blast gas to the tuyere means, the blast gas including atmospheric air containing water vapor, first measuring means for measuring the rate of flow of blast gas through the compressor means, control means operative responsively to the measuring means for controlling the compressor means, means including first conduit means for introducing a stream of oxygen rich gas into the blast gas, second measuring means for measuring the rate of flow of the stream of oxygen rich gas, comparing means operative responsively to the first and second measuring means, control means operative responsively to the comparing means for controlling the rate of flow of the stream of oxygen rich gas, means including second conduit means for introducing a stream of water vapor into the blast gas, and means for controlling the rate of flow of the stream of water vapor in the second conduit means to maintain a constant quantity of water vapor in the blast gas blown to the tuyere means irrespective of the amount of water vapor in the atmospheric air.*

*24. In a blast furnace installation including a blast furnace having tuyere means through which blast gas is discharged into the furnace, means including compressor means for blowing blast gas to the tuyere means, the blast gas including atmospheric air containing water vapor, measuring means for measuring the rate of flow of blast gas through the compressor means, control means operative responsively to the measuring means for controlling the compressor means, means including first conduit means for introducing oxygen to the blast gas, means including second conduit means for introducing water vapor into the blast gas, moisture measuring means for measuring the moisture content of blast gas on its way to the tuyere means, and moisture control means operative responsively to the moisture measuring means for controlling the flow of water vapor in the second conduit means to maintain a substantially constant quantity of water vapor in the blast gas blown to the tuyere means irrespective of the amount of water vapor in the atmospheric air.*

*25. In a blast furnace installation including a blast furnace having tuyere means through which blast gas is discharged into the furnace, means including compressor means for blowing blast gas to the tuyere means, the blast gas including atmospheric air containing water vapor, measuring means for measuring the rate of flow of*

*blast gas through the compressor means, control means operative responsively to the measuring means for controlling the compressor means, means including first conduit means for introducing oxygen to the blast gas, means including second conduit means for introducing water vapor into the blast gas, measuring means for measuring the moisture content of blast gas on its way to the tuyere means, moisture control means including comparing means for comparing the moisture content of the blast gas and a predetermined moisture content, and means for controlling the rate of flow of water vapor into the blast gas responsively to the comparing means to maintain a moisture content in the blast gas substantially corresponding to the predetermined moisture content irrespective of the natural moisture content of the atmospheric air.*

*26. In a blast furnace installation including a blast furnace having tuyere means through which blast gas is discharged into the furnace, means including compressor means for blowing blast gas to the tuyere means, the blast gas including atmospheric air containing water vapor, measuring means for measuring the rate of flow of blast gas through the compressor means, control means operative responsively to the measuring means for controlling the compressor means, means including first conduit means for introducing oxygen to the blast gas, means including second conduit means for introducing water vapor into the blast gas, second measuring means for*

*measuring the rate of flow of oxygen to the blast gas, first comparing means operative responsively to the first and second measuring means, means for controlling the rate of flow of oxygen responsively to the first comparing means, means for measuring the moisture content of blast gas blown to the tuyere means, moisture control means including second comparing means for comparing the moisture content of the blast gas and a predetermined moisture content, and means for controlling the rate of flow of water vapor responsively to the second comparing means to maintain a moisture content in the blast gas substantially corresponding to the predetermined moisture content irrespectve of the natural moisture content of the atmospheric air.*

References Cited in the file of this patent or the original patent

UNITED STATES PATENTS

| | | |
|---|---|---|
| 1,510,271 | Gottschalk | Sept. 30, 1924 |
| 1,518,854 | Kirby | Dec. 9, 1924 |
| 1,921,212 | Braseert | Aug. 8, 1933 |
| 2,079,019 | Karwat | May 4, 1937 |
| 2,386,292 | Carrier | Oct. 9, 1945 |
| 2,625,386 | Leone | Jan. 13, 1953 |

FOREIGN PATENTS

| | | |
|---|---|---|
| 495,733 | Belgium | May 31, 1950 |
| 498,148 | Belgium | Sept. 30, 1950 |